United States Patent [19]

Lin

[11] Patent Number: 5,144,630

[45] Date of Patent: Sep. 1, 1992

[54] MULTIWAVELENGTH SOLID STATE LASER USING FREQUENCY CONVERSION TECHNIQUES

[75] Inventor: J. T. Lin, Winter Springs, Fla.

[73] Assignee: JTT International, Inc., Orlando, Fla.

[21] Appl. No.: 736,931

[22] Filed: Jul. 29, 1991

[51] Int. Cl.$^5$ ................................................ H01S 3/10
[52] U.S. Cl. ........................................ 372/22; 372/21; 372/23; 359/330
[58] Field of Search ............................. 372/21, 22, 23; 359/330; 385/328

[56] References Cited

U.S. PATENT DOCUMENTS

| | | | |
|---|---|---|---|
| 4,180,751 | 12/1979 | Ammann | 359/330 |
| 4,349,907 | 9/1982 | Campillo et al. | 372/21 |
| 4,386,428 | 5/1983 | Baer | 372/22 |
| 5,065,046 | 11/1991 | Guyer | 372/21 |

*Primary Examiner*—Leon Scott, Jr.
*Attorney, Agent, or Firm*—William M. Hobby, III

[57] ABSTRACT

A process and apparatus are disclosed for producing multiwavelength coherent radiations ranging from deep-ultraviolet to mid-infrared. The basic laser is a pulsed Nd:YAG or Nd:YLF laser which is frequency converted by a set of novel nonlinear crystals including D-CDA, LBO, BBO, KTP, and KNbO$_3$, where efficient schemes using noncritical phase matching and cylindrical focusing are employed. A computer controlled integrated system suitable for multiple industrial and medical applications is described, particularly where a UV (at 210 nm and 213 nm) solid state laser is desired such as in refractive surgery. Furthermore, using optical parametric oscillation in nonlinear crystals, the laser system can produce tunable (1.5–4.5 microns) wavelengths covering a variety of medical applications.

31 Claims, 2 Drawing Sheets

MULTIWAVELENGTH SOLID STATE LASER USING FREQUENCY CONVERSION TECHNIQUES

BACKGROUND OF THE INVENTION

1. Field of the Invention

This invention relates generally to multiwavelength laser sources using novel nonlinear crystals for frequency conversion of solid state lasers. More particularly, this invention relates the generation of coherent radiations at ultraviolet, visible and infrared wavelengths which are selected by frequency converters for multiple industrial and surgical applications. This invention is particularly, but not exclusively, useful for ophthalmic surgery.

2. Prior Art

Various commercial lasers have been used for surgical treatments including gas lasers (such as $CO_2$, excimer, argon, cu- vapor lasers), liquid lasers (dye lasers) and solid state lasers (such as YAG, semiconductor, Ti:sapphire lasers). Important parameters for laser technology include wavelength, energy (or fluence), intensity (or power) and repetition rate which are designed for the particular purpose being employed. For medical applications which are governed mainly by the laser beam's wavelength, there is a strong need for a multiple-purpose laser system in which multiwavelengths may be generated from a single laser unit. A variety of laser active media are currently used for the generation of different wavelengths suitable for particular surgical applications. Typical examples of these laser active media are: Nd:YAG (for 1.064 microns), Ho:YAG (for 2.1 microns), Er:YAG (for 2.94 microns) and excimer lasers (for ultraviolet, 193-351 nm). A dual-wavelength (at 532 nm and 1064 nm) solid state laser using a frequency-doubled Nd:YAG laser is currently used for surgical treatments such as gynecology. For ophthalmic surgery, YAG-based lasers with dopants of Nd, Ho, or Er with output wavelengths at approximately 1, 2 and 3 microns and excimer lasers (at 193 nm, 308 nm) have been used, where the Ho:YAG, Er:YAG and excimer lasers (at 193) are known as the candidates for refractive surgery using either external ablation (corneal tissue bond-breaking) or internal ablation (elastic alternation).

In light of the above, it is an object of the present invention to incorporate a frequency-converter using nonlinear crystals capable of producing a multiwavelength beam having all the wavelengths described above (from ultraviolet to infrared), where a particular surgical treatment may be achieved from a single laser system by switching the frequency-converter. In particular, the invention discloses a solid state laser at wavelength 210 nm or 213 nm which is a potential substitute for the argon fluoride excimer laser but has the advantages of lower-cost, smaller- size, less-maintenance, greater precision and, more importantly, the absence of toxic and hazardous materials. Another objective of the present invention is to produce a yellow laser with wavelength around 585-589 nm by using frequency mixing of two solid state lasers in lithium triborate (LBO) crystal. This yellow laser provides a variety of surgical applications which are currently being performed by krypton or copper vapor lasers. It is yet another object of the present invention to use optical parametric oscillation in nonlinear crystals, in which the disclosed laser system can produce tunable (1.5-4.5 microns) wavelengths covering medical applications which currently use holmium and erbium lasers.

Besides ophthalmic surgery, the multiwavelength solid state laser disclosed in this invention may be applied to many other medical surgeries such as laser angiosurgery, laser lithotripsy and laser neurosurgery. Among many potential industrial applications, the ultraviolet wavelength produced by the present invention provides a fast and precise tool for optical processing and micromachining.

Nonlinear crystals are the essential elements of the present invention. Efficiency is always the key issue of any frequency conversion technique (FCT) using nonlinear crystals. The FCTs used in this invention include second harmonic generation (SHG), fourth harmonic generation (4 HG) and fifth harmonic generation (5 HG) which converts a laser output into shorter wavelengths $\frac{1}{2}$, $\frac{1}{4}$ and 15 of the fundamental wavelength, respectively. The frequency conversion efficiency depends on both the laser and the nonlinear crystal parameters such as beam divergence, beam quality, focusing, beam walk-off and crystal damage threshold. Moreover, this invention also employs the optical parametric oscillation (OPO) process which converts the fundamental wavelength to longer but tunable wavelengths.

The present invention uses nonlinear crystals including beta barium borate (BBO), lithium triborate (LBO), potassium titanyl phosphate (KTP) and potassium niobate ($KNbO_3$). Among these crystals, LBO is a new novel crystal suitable for high-power laser application and BBO is a unique crystal which provides the ultraviolet wavelength (shorter than 220 nm). The properties, applications and description of the frequency conversion techniques used in this invention were published by the inventor, J. T. Lin, in Optical and Quantum Electronics, Vol. 22, S383-S313 (1990); Optics Communication, Vol. 80, 159 (1990). Another object of the present invention is to integrate these nonlinear crystals into one single unit for multiple medical applications and, in particular, for ophthalmic surgery using the ultraviolet and mid-infrared wavelength produced by the all solid state multiwavelength laser.

Prior art U.S. Patents that for the making of beta barium borate can be seen in U.S. Pat. No. 4,897,249 for a Barium Borate Preparation and in U.S. Pat. No. 4,931,133 for a High Temperature Solution Growth of Barium Borate ($BaB_2O_2$) Other U.S. patents suggesting the use of Barium Borate in a laser system can be seen in U.S. Pat. No. 4,809,291 for a Diode Pumped Laser and Doubling to obtain Blue Light which suggest the use of a number of non linear electro-optic doubler materials including beta barium borate and in U.S. Pat. No. 4,933,945 for an Arrangement for Converting the Frequency of a Laser Beam which suggests that if the frequency is to be tripled in the apparatus shown, then a BBO crystal can be used in lieu of the KTP crystal. In U.S. Pat. No. 4,879,722 for a Generation of Coherent Optical Radiation by Optical Mixing a diode pumped neodymium doped lasant material such as Nd:YAG is used with a nonlinear crystal in the same cavity and suggests the use of potassium titanyl phosphate ($KTiOPO_4$) but also mentions other known nonlinear crystals as including beta barium borate. U.S. Pat. No. 4,884,277 also uses a diode pumped Nd:YAG laser having two or more nonlinear crystals in the same cavity and suggests beta barium borate as one of the crystals in which all of the crystals can be of the same material or may include different crystals used in combination.

SUMMARY OF THE INVENTION

Towards this end and according to the present invention, a preferred embodiment of the novel multiwavelength solid state laser apparatus includes a standard commercial Nd:YAG or Nd:YLF pulsed laser which is frequency converted by a set of nonlinear crystals consisting of LBO, BBO, KTP and KNbO$_3$ having output wavelengths of ultraviolet (UV), green, yellow and infrared (IR). One or more than one multiwavelength may be selected by switching to the appropriate frequency converters which are integrated in one laser unit. The selected wavelength(s) is then delivered by the appropriate optics for a particular surgery. The process and apparatus of the present invention embody the following features and applications:

(1) Use of temperature-controlled LBO crystal which is operated at the noncritical phase-matching (NCPM); high efficiency of frequency doubling (for green laser) and frequency mixing (for yellow laser) are achieved under this condition which causes no beam walk-off. LBO is the crystal having the highest damage threshold among the existing crystals. High-power green and yellow lasers are uniquely achieved in the NCPM LBO crystal. High efficient second harmonic generation (SHG) is essential for the generation of high-power UV radiation.

(2) Two BBO crystals with phase matching angle cuts at 47.6° and 51° respectively are used for the 4 HG and 5 HG of the fundamental laser, where BBO is the crystal for the UV radiation using the 5 HG of a YAG laser.

(3) KTP or KNbO$_3$ crystals are chosen for tunable IR radiation, where these crystals are pumped by the fundamental laser. High efficiency is achievable by using the NCPM (at room temperature) of KTP and the high nonlinearity of KNbO$_3$.

(4) A preferred embodiment of the present invention is based on state-of-the-art laser technology using the commercial Nd:YAG or Nd:YLF laser. These basic lasers are well-established and may be operated at pulse durations of subpicosecond to tens of nanoseconds, and at repetition rates of few Hz to GHz. Therefore, the multiwavelength laser disclosed in the present invention can also reserve all the good features of the basic lasers while expanding their spectra from UV to IR ranges using a set of nonlinear crystals.

(5) For refractive surgery, the present invention provides the all-solid-state laser with UV wavelengths (at 210 nm or 213 nm) which has significant advantages over the currently used excimer laser (at 193 nm) including lower-cost, smaller-size, less-maintenance, more-precision and the absence of toxic gas and hazardous material. Furthermore, the fourth harmonic (at 263 nm or 266 nm) has a better fiber transmission than that of the argon fluoride excimer laser (at 193 nm) and may be used for laser trabeculoplasty and laser photocoagulation.

(6) The multiwavelength laser system of the present invention provides a unique system which is capable of multiple applications by simply switching the frequency converters.

The foregoing and other features and advantages of the invention will be apparent from the following more particular description of preferred embodiments thereof as illustrated in the accompanying drawings.

DETAILED DESCRIPTION OF THE PREFERRED EMBODIMENT

Figure 1:
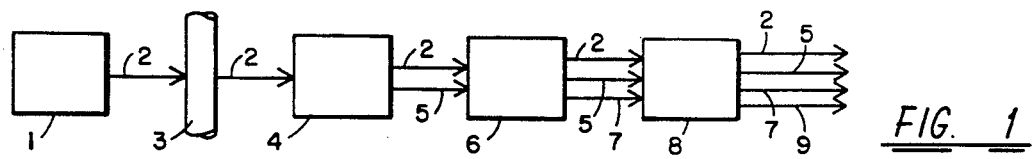
FIG. 1 is a block diagram showing the harmonic generation of a pulsed solid state laser with multiwavelengths of IR, green, and UV spectra.

Referring to FIG. 1, the optical system according to this embodiment of the present invention, comprises a commercial pulsed solid state laser 1 having an IR wavelength 2 (1.064 nm for Nd:YAG, 1.053 nm for Nd:YLF) and is coupled by optics 3 into the first nonlinear doubling crystal 4 producing a second harmonic beam having a green wavelength (530 nm for Nd:YAG, 527 nm for Nd:YLF). The harmonic beam 5 is further frequency converted by the second nonlinear crystal 6 producing a fourth harmonic beam having a UV wavelength 7 (266 nm for Nd:YAG, 260 nm for Nd:YLF). The fundamental beam 2 and the fourth harmonic 7 are then frequency mixed in the third nonlinear crystal 8 producing a fifth harmonic beam having a shorter UV wavelength 9 (213 nm for Nd:YAG, 210 nm for Nd:YLF).

Still referring to FIG. 1, the basic solid state laser 1, according to the present invention, is an optically pumped system (either flashlamp pumped or diode laser pumped) which is commercially available with a pulse duration ranging from subpicosecond to few tens nanoseconds with a repetition rate ranging from a few Hz to a few GHz. It is well known that this basic laser 1 is available by the standard means of Q-switch or mode-lock and is available from laser companies such as Coherent, Inc. and Quantronix, Inc., where the preferred lasing media of the present invention are Nd:YAG and Nd:YLF.

The nonlinear crystals used in FIG. 1 in general should include D-CDA (deuterated cecium dihydrogen arsenate), D-KDP (deuterated potassium dihydrogen phosphate), KTP (potassium titanyl phosphate), LBO (lithium triborate), and BBO (beta barium borate). The first preferred embodiment of the present invention consists of LBO or KTP for doubling, and BBO for fourth and fifth harmonic generation. In this embodiment the LBO crystal was housed in an oven at a temperature around 149° C. (for Nd:YAG laser) and 161° C. (for Nd:YLF laser), which were measured to be the noncritical phase matching (NCPM) condition. Under this NCPM condition, conversion efficiency was optimized in the absence of beam walk-off. The fourth and the fifth harmonic generation crystals of BBO, 6 and 8, were angle cut at 47.6° and 51°, respectively, for the type 1 operation.

The second preferred embodiment of the present invention consists of type I D-CDA for doubling and type I D-KDP for quadrupling, where efficient room temperature operation can be achieved due to the small beam walk-off effects and long crystal length (20 to 30 mm). Moreover for the case of high power lasers which may damage the crystal, a large beam spot size is preferred and a large crystal size is required. The combination of D-CDA and D-KDP provides the cost effective operation.

The present invention recognizes that BBO crystal is the unique nonlinear crystal having UV transmission and is phase matchable for fifth harmonic generation of a Nd:YAG or Nd:YLF laser. The combination of LBO and BBO crystals in the preferred embodiment of the present invention provides a high overall efficiency for the generation of multiwavelengths at green and two UV wavelengths. Furthermore, the conversion efficiency can be improved by using a cylindrical focal lens in the optical component 3, where the fundamental beam 2 is focused more tightly along the insensitive direction of the LBO and BBO crystals.

Figure 2A:
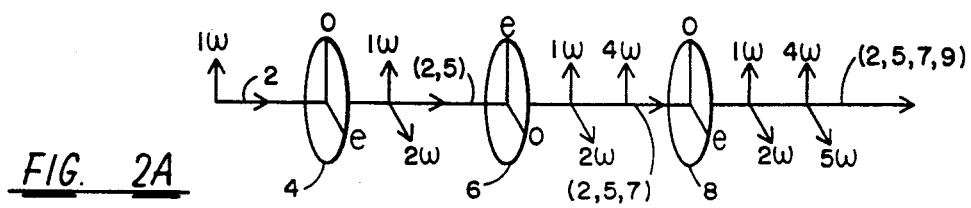
FIGS. 2A and 2B are schematic diagrams of the polarization directions of the fundamental and the harmonic beams associated with FIG. 1.
Figure 2B:
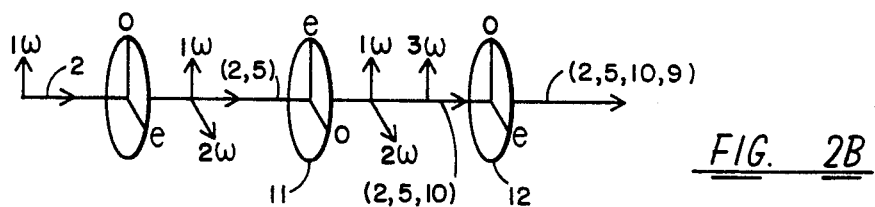

As illustrated in FIG. 2, there are two alternative embodiments which are able to produce the fifth harmonic generation using either type I or type II operations. FIG. 2.A shows the polarization direction of the fundamental and the harmonic using type I operation, where a good spatial overlap between the fundamental 2 and the fourth harmonic 7 beam is achieved in the appropriate polarization for the generation of fifth harmonic 9. As shown in FIG. 2.B, the fifth harmonic can also be produced by combining type II doubling (using KTP or D-KDP) and tripling, where the third harmonic 10 (produced by a type II tripling crystal 11, LBO or BBO) is mixed with the second harmonic 5 in a BBO crystal 12 (angle cut at 69.5° for type II operation) for the fifth harmonic generation 9. This preferred embodiment represents the simplest structure that combines three nonlinear crystals having the appropriate polarization orientations for both type I and type II operations. No waveplates are required in this embodiment.

Figure 3:
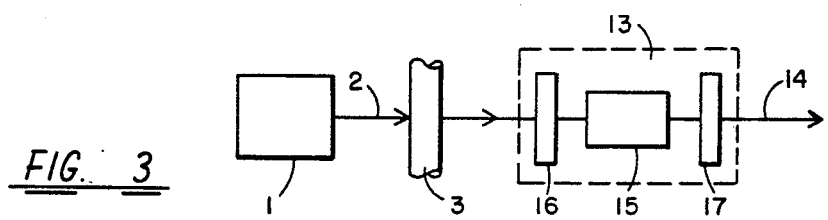
FIGS. 3, 3A and 3B are schematic diagrams of the generation of tunable IR sources using optical parametric oscillation.
Figure 3A:
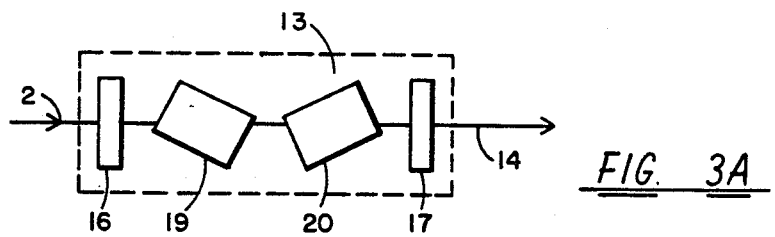

FIG. 3 illustrates the basic pulsed solid state laser 1 having the IR wavelengths 2 which is focused by the optics 3 into an optical parametric oscillation (OPO) cavity 13 to produce the tunable IR wavelength 14 ranging from 1.5 to 4.5 nm. Three preferred embodiments of the OPO cavities are disclosed in the present invention. The first embodiment 13 is compressed of a nonlinear crystal 15 (KTP or $KNbO_3$) and a pair of mirrors 16 and 17 with the appropriate coatings: mirror 16 has high transmission at the pump (fundamental) wavelength and high reflection at the signal (1.5–4.5 nm) wavelengths; mirror 17 should be coated for coupling at 10% to 20% at the signal wavelength.

The second embodiment 13 shown in FIG. 3 is comprised of two nonlinear crystals 19 and 20 which are slightly oriented in the extraordinary index direction to compensate the beam walk-off inside the crystals 19 and 20. The third embodiment 13 shows that the output power of the signal 14 can be further enhanced by going through another nonlinear crystal 21 which serves as an amplifier.

Figure 3B:
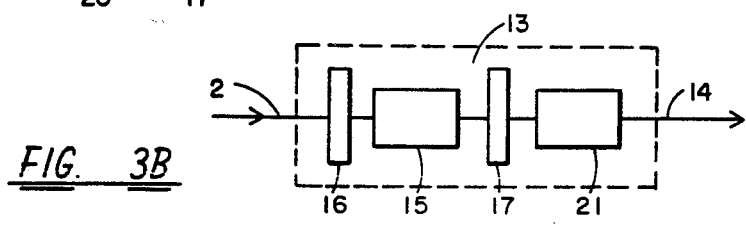

Referring to FIG. 3B, the optics 3 is preferred to be a cylindrical focal length resulting in tighter focusing of the fundamental beam 2 in the insensitive direction of the nonlinear crystals 15, 19, 20, and 21. The nonlinear crystals used in the OPO cavity should be angle cut for the appropriate tuning ranges. For example, KTP should be cut at approximately 50° in the XZ plane of the crystal, where the tuning range of 1.5 to 4.5 nm is achievable by angle tuning of a few degrees. Alternatively, an angle cut at 54° is preferred for the generation of signal wavelengths of around 2 nm using the degenerate point. The present invention also recognizes that noncritical phase matching (NCPM) in KTP can be achieved at room temperature, where the pumping beam can propagate along X or Y axis of the crystal. Under this NCPM condition, high efficiency is achievable for the generation of IR wavelengths at around 1.54–1.6 microns and 3.2–3.4 microns due to the absence of the beam walk-off effect. The alternative nonlinear crystal $KNbO_3$ which has a higher nonlinearity than KTP is also recognized in the present invention, where an angle cut at around 41° in the XZ plane is preferred for the OPO output signal wavelength range of 1.5 to 4.5 nm. $KNbO_3$ has narrower acceptance widths (angular and spectral) than that of KTP, whereas $KNbO_3$ has the higher efficiency and tunability. In the present invention we also disclose that the eye safe wavelength at 1.54 nm can be achieved efficiently by using $KNbO_3$ (angle cut) or KTP (NCPM condition with the pump beam propagating along the Y axis), where the NCPM in KTP is a unique operation achieving the eye safe radiation at 1.54 nm.

Figure 4:
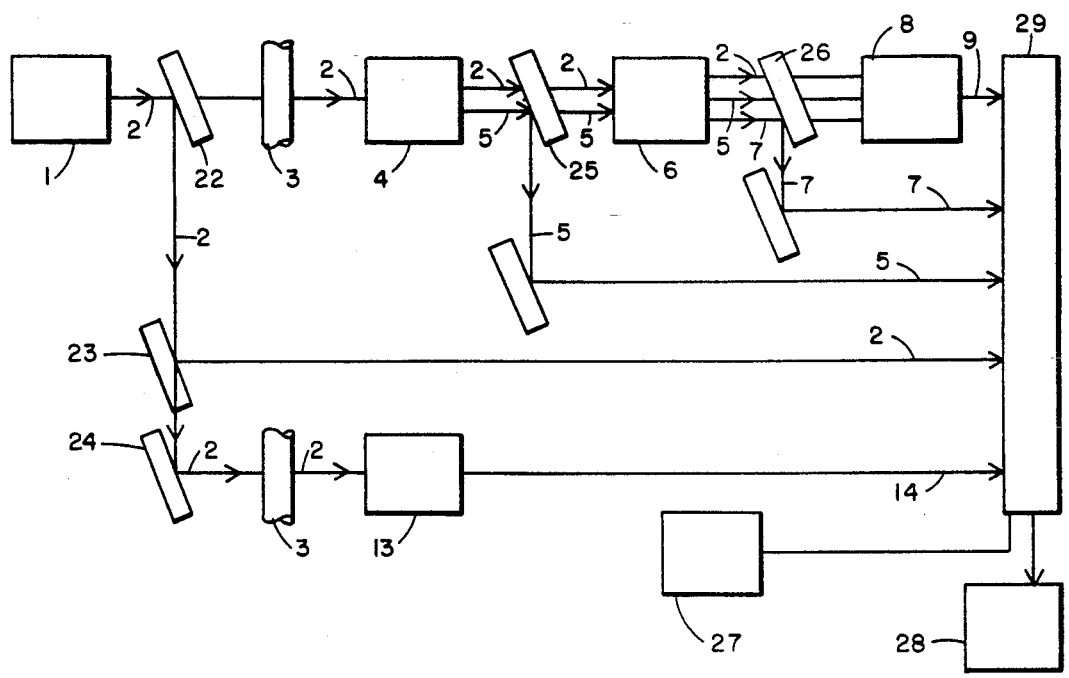
FIG. 4 is a block diagram showing an integrated system which combines FIG. 1 and FIG. 3 for multiwavelength surgical applications.

As illustrated in FIG. 4, a preferred embodiment for the integrated system combining the multiwavelengths generated from FIGS. 1 and 3. A novel feature of this integrated system includes the multiwavelength flexibility achievable from a commercially available single solid state laser, where the system can be upgraded to cover a wide range of spectra (UV to IR) simply by incorporating additional frequency converters. These frequency converters are comprised of one or more than one nonlinear crystal(s) defined in FIGS. 1 and 3. As shown in FIG. 4, specific wavelengths 2, 5, 7, 9 and 14 can be easily selected by the beam splitters 22 to 26 for either one specific or multiple applications including industry, scientific, or medical uses. Examples of applications of this integrated system as discussed in the summary of the present invention should include, but not be limited to, ophthalmic surgery (such as refractive surgery using UV and mid-IR wavelengths), laser angiosurgery, laser lithotripsy and laser neurosurgery, high resolution optical processing and micromachining.

Still referring to FIG. 4, the multiwavelengths, 2, 5, 7, 9 and 14, can be controlled and selected by a computer system 27 and delivered to the target 28 by the delivery system 29. The computer system 27 is comprised of a software package designed for wavelength selection, energy/power adjustability and stabilization, and the total fluence applied to the target 28. The target 28 can be tissue or any other material.

Figure 5:
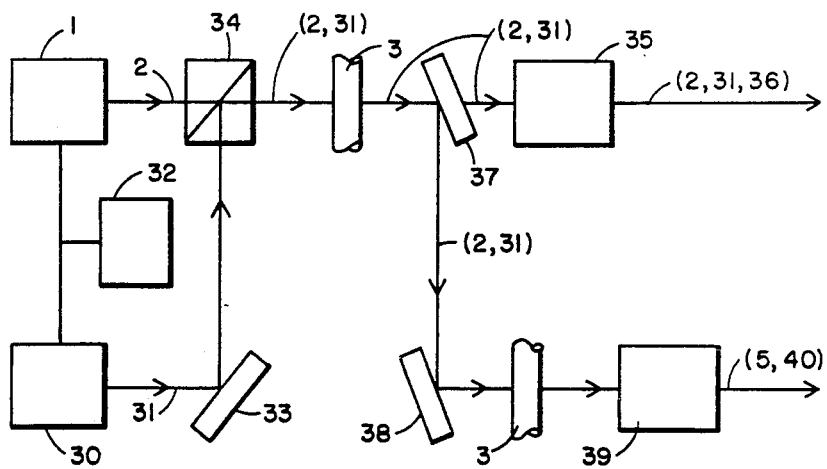
FIG. 5 is a schematic diagram of the generation of yellow coherent source using frequency mixing in nonlinear crystal.

Referring to FIG. 5, two basic solid state lasers, 1 and 30, having a wavelength 2 at 1.064 nm for Nd:YAG (or 1.053 nm for Nd:YLF) and having a wavelength 31 at 1.319 nm (or 1.32 nm) are locked by a phase locker 32 and coupled by a turning mirror 33 and a polarization coupler 34. These two wavelengths, 2 and 31, are then focused by optics 3 into a nonlinear crystal 35 for sum frequency mixing into a wavelength 36 at 589 nm (for Nd:YAG) or 585 nm (for Nd:YLF).

The nonlinear crystals for frequency mixing include KTP, BBO, $KNbO_3$ and LBO. The preferred nonlinear crystal 35, for the case of high power lasers in the present invention, is the noncritical phase matching LBO crystal which is temperature tuned at around 42° C. for a high efficiency in the absence of beam walk-off effects.

Still referring to FIG. 5, the IR lasers, 1 and 30, with wavelengths, 2 and 31, can be delivered by mirrors, 37 and 38, and focused by optics 3 into a doubling crystal 39 for the generation of the harmonics with wavelengths 5 (at 527 nm or 532 nm) and 40 (at 660 nm).

It is recognized by the present invention that visible coherent sources at green, yellow, and red spectra produced by the embodiment shown in FIG. 5 provides the alternative for medical applications which are currently performed by cu-vapor, krypton, argon ion, or doubled-YAG lasers. Moreover, the three color laser with wavelengths at green, yellow and red, has potential applications for large screen TVs. It is also recognized in the present invention that the embodiment shown in FIG. 5 can also be integrated into the embodiment shown in FIG. 4. The integrated system is then capable of producing multiwavelengths including UV (210 nm, 213 nm, 263 nm, 266 nm), visible (yellow, green, red), and IR (1.064 um, 1.053 um, 1.5 to 4.5 um) spectra.

One of the preferred ophthalmic applications using the UV wavelengths generated by the present invention described in FIG. 1 is further described as follows. The UV wavelengths 9 (either 213 nm or 210 nm) are recognized in the present invention as excellent candidates for refractive surgery including the correction of nearsightedness, farsightedness, astigmatism, and other vision deficiencies. The solid state UV laser disclosed at the present invention will offer ophthalmologists significant advantages over excimer lasers, including lower cost, smaller-size, lower maintenance, greater precision, and absence of toxic and hazardous materials. Moreover, this integrated system will offer multiple surgical capabilities using the unique triple wavelength technology controlled by the frequency converters. Triple wavelengths at the near-IR (around 1 um), green, and UV are achieved by the embodiment shown in FIG. 1, and three IR wavelengths at around 1, 2, and 3 um are achievable by the embodiment shown in FIG. 3. Moreover, precise microsurgery can be done by scanning the predetermined-wavelength beam to the corneal surface, where beam spot sizes range from a few microns to a few millimeters are available. For the case of short pulse (subpicosecond to a few picosecond duration) and high repetition rate (kHz to GHz), very high beam density can be achieved by tight focusing of the beam, where photoablation processes can be done when the laser power density is higher than the photoablation threshold. On the other hand, for the case of longer pulse (nanosecond range) and low repetition rate (5 to 50 Hz), larger area corneal ablation can be achieved when the laser fluence is higher than the ablation threshold. Moreover, the computer control system 27 is able to predetermine the shape of the corneal surface that needs to be reshaped by beam delivery systems such as diaphragm, rotating disc, or rotating slits, where the predetermined wavelength beam can be delivered to the target in the predetermined pattern by using the commercially available scanning systems.

While the nonlinear crystals are herein shown and disclosed in detail are crystals in bulk form which suitable for high peak power lasers, nonlinear crystals in the waveguided form should not be excluded from consideration particularly for diode-pumped low power lasers. These nonlinear waveguides should include KTP, MgO:LiNbO$_3$, LiTaO$_3$, and the self-frequency doubling crystal of NYAB (neodymium yttrium aluminum borate). The NYAB crystal is particularly attractive for the generation of green coherent source (at 531 nm) using diode lasers as the pumping source. Furthermore, the solid state lasers, 1 and 30, can be diode laser pumped systems or systems which combine flashlamp pumped and diode pumped lasers, where good beam quality, single mode lasers are commercially available by using injection seeding.

While the invention has been shown and described with reference to preferred embodiments thereof, it will be understood by those skilled in the art that the foregoing and other changes and variations in form and detail may be made therein without departing from the spirit, scope and teaching to the invention. Accordingly, the method and apparatus, and the industry and medical applications herein disclosed are to be considered merely as illustrative and the invention is to be limited only as specified in the claims.

I claim:

1. A laser apparatus for producing a fifth harmonic generation beam of predetermined wavelength comprising:

a solid state laser;

a first nonlinear crystal for producing a second harmonic beam;

focusing optics for focusing said solid state laser beam into said first nonlinear crystal;

a second nonlinear crystal positioned adjacent said first nonlinear crystal for receiving a beam therefrom and producing a fourth harmonic beam; and a third nonlinear crystal of beta barium borate positioned adjacent said second nonlinear crystal for receiving a beam therefrom and producing a fifth harmonic beam; whereby a solid state laser produces a fifth harmonic coherent beam of predetermined wavelength.

2. A laser apparatus for producing a fifth harmonic generation beam of predetermined wavelength in accordance with claim 1 in which said second nonlinear crystal is beta barium borate.

3. A laser apparatus for producing a fifth harmonic generation beam of predetermined wavelength in accordance with claim 1 in which said solid state laser is an optically-pumped Nd:YAG laser with pulse durations of $10^{-13} - 10^{-6}$ second and repetition rate of $1-10^9$ Hertz.

4. A laser apparatus for producing a fifth harmonic generation beam of predetermined wavelength in accordance with claim 3 in which said first nonlinear crystal is lithium triborate (LBO) operated at the non-critical phase matching (NCPM) temperatures of approximately 149° C.

5. A laser apparatus for producing a fifth harmonic generation beam of predetermined wavelength in accordance with claim 1 in which said solid state laser is an optically-pumped Nd:YLF laser with pulse duration of $10^{-13}-10^{-6}$ second and repetition rate of $(1-10^9)$ Hertz.

6. A laser apparatus for producing a fifth harmonic generation beam of predetermined wavelength in accordance with claim 4 in which said first nonlinear crystal is lithium triborate (LBO) operated at the NCPM temperatures of approximately 161° C.

7. A laser apparatus for producing a fifth harmonic generation beam of predetermined wavelength in accordance with claim 1 in which said first nonlinear crystal is potassium titanyl phosphate (KTP).

8. A laser apparatus for producing a fifth harmonic generation beam of predetermined wavelength in accordance with claim 1 in which said first nonlinear crystal is D-CDA.

9. A laser apparatus for producing a fifth harmonic generation beam of predetermined wavelength in accordance with claim 1 in which said second nonlinear crystal is type I D-KDP.

10. A laser apparatus for producing a fifth harmonic generation beam of predetermined wavelength in accordance with claim 1 in which said second nonlinear crystal is BBO having an angle cut of approximately 47.6 degrees.

11. A laser apparatus for producing a fifth harmonic generation beam of predetermined wavelength in accordance with claim 1 in which said third nonlinear crystal is a type I LBO crystal having an angle cut of approximately 51 degrees.

12. A laser apparatus for producing a fifth harmonic generation beam of predetermined wavelength in accordance with claim 1 in which said first nonlinear crystal is a type II doubler crystal, the second nonlinear crystal is a type II tripler crystal and the third nonlinear crystal is a type II fifth harmonic generation using a BBO crystal.

13. A laser apparatus for producing a fifth harmonic generation beam of predetermined wavelength in accordance with claim 1 in which said focusing optics includes a cylindrical lens.

14. An integrated laser apparatus for producing multiwavelength coherent energy sources comprising:
a solid state laser;
beam splitter means mounted to receive the output beam from said solid state laser and to split the beam into at least three separate beams;
a delivery system for receiving a plurality of laser beams of difference wavelength and outputting one of the plurality of laser beams;
a first nonlinear crystal positioned adjacent said beam splitter means for receiving one said beam therefrom and for generating a second harmonic beam therefrom;
a second harmonic beam splitter positioned adjacent said first nonlinear crystal for directing the second harmonic beam to said delivery system;
a second nonlinear crystal positioned adjacent said second harmonic beam splitter for receiving a beam from first nonlinear crystal and generating a fourth harmonic beam therefrom;
a fourth harmonic beam splitter positioned adjacent said second nonlinear crystal for directing a fourth harmonic beam to said delivery system;
a third nonlinear crystal positioned adjacent said fourth harmonic beam splitter for receiving a beam therefrom and generating a fifth harmonic beam and directing said fifth harmonic beam therefrom to said delivery system;
a second beam from said beam splitter means being directed to said delivery system; and
an optical parametric oscillator positioned adjacent said beam splitter means to receive a third beam therefrom and having a continuously tunable output beam directed towards said delivery system, whereby a plurality of coherent light beams of different frequencies are directed towards delivery system which selectively output one of said input beams.

15. An integrated multiwavelength coherent energy sources in accordance with claim 14 having a pair of focusing cylindrical lens, one cylindrical lens being positioned adjacent said beam splitter means for focusing one laser beam onto said first nonlinear crystal and a second cylindrical lens for focusing said third beam from said beam splitter means into said optical parametric cavity.

16. An integrated multiwavelength coherent energy sources in accordance with claim 15 in which said delivery system includes computer controlled optic means for receiving a plurality of input beams of different frequencies and outputting one of said plurality of input beams towards a target.

17. An integrated multiwavelength coherent energy sources in accordance with claim 14 in which said second nonlinear crystal is LBO.

18. An integrated multiwavelength coherent energy source in accordance with claim 14 in which said second nonlinear crystal is KTP.

19. An integrated multiwavelength coherent energy sources in accordance with claim 14 in which said second nonlinear crystal is BBO.

20. An integrated multiwavelength coherent energy sources in accordance with claim 14 in which said second nonlinear crystal is $KNbO_3$.

21. An integrated multiwavelength coherent energy sources in accordance with claim 14 in which said first nonlinear crystal is a nonlinear waveguide made of KTP.

22. An integrated multiwavelength coherent energy sources in accordance with claim 14 in which said second nonlinear crystal is a nonlinear waveguide made of KTP.

23. An integrated multiwavelength coherent energy sources in accordance with claim 14 in which said delivery system includes computer controlled optic means for receiving a plurality of input beams of different frequencies and outputting one of said plurality of input beams towards a target.

24. An integrated multiwavelength coherent energy sources in accordance with claim 14 in which said delivery system includes computer controlled optic means for receiving a plurality of input beams of different frequencies and outputting one of said plurality of input beams towards a target.

25. An integrated multiwavelength coherent energy sources in accordance with claim 14 in which said delivery system includes computer controlled optic means for receiving a plurality of input beams of different frequencies and outputting one of said plurality of input beams towards a target.

26. A multi-wavelength laser apparatus for producing coherent sources of energy comprising:
a first solid state laser;
a second solid state laser;
phase lock means coupling said first and second solid state lasers to phase lock the beams from the first and second solid state lasers;
a polarization coupler coupling the beams from said first and second solid state lasers together to produce a laser beam having two wavelengths;
a beam splitter positioned to split the beam from the polarization coupler into first and second beam paths;
a first nonlinear crystal positioned to receive the first beam from said beam splitter for sum wavelength mixing two wavelengths to produce a third wavelength;
a second nonlinear crystal positioned to receive a second beam from said beam splitter for generating a harmonic wavelength therefrom, whereby a plurality of coherent light beams of different wavelengths are produced at the output of the laser system.

27. A multi-wavelength laser apparatus for producing coherent sources of energy in accordance with claim 26 in which said first nonlinear crystal is lithium triborate (LBO).

28. A multi-wavelength laser apparatus for producing coherent sources of energy in accordance with claim 26 in which said second nonlinear crystal is lithium triborate (LBO).

29. A multi-wavelength laser apparatus for producing coherent sources of energy in accordance with claim 26 in which said second nonlinear crystal is KTP.

30. A multi-wavelength laser apparatus for producing coherent sources of energy in accordance with claim 26 in which said second nonlinear crystal is BBO.

31. A multi-wavelength laser apparatus for producing coherent sources of energy in accordance with claim 26 in which said second nonlinear crystal is $KNbO_3$.

* * * * *